United States Patent [19]

Schmidt

[11] Patent Number: 5,249,598
[45] Date of Patent: Oct. 5, 1993

[54] BI-DIRECTIONAL VENT AND OVERPRESSURE RELIEF VALVE

[75] Inventor: William J. Schmidt, Xenia, Ohio

[73] Assignee: Vernay Laboratories, Inc., Yellow Springs, Ohio

[21] Appl. No.: 923,572

[22] Filed: Aug. 3, 1992

[51] Int. Cl.⁵ .................................... F16K 17/196
[52] U.S. Cl. .................... 137/493.1; 137/512.15; 137/846
[58] Field of Search ............... 137/493.1, 512.15, 846

[56] References Cited

U.S. PATENT DOCUMENTS

| | | | |
|---|---|---|---|
| 996,588 | 6/1911 | Kennedy | 137/846 X |
| 3,155,110 | 11/1964 | Hoffman | 137/846 X |
| 3,159,176 | 12/1964 | Russell | 137/493.1 |
| 3,580,273 | 5/1971 | Schwarz | 137/493.1 |
| 3,693,651 | 9/1972 | Gifford | 137/493 |
| 3,941,149 | 3/1976 | Mittleman | 137/493.1 |
| 4,434,810 | 3/1984 | Atkinson | 137/493 |
| 4,458,711 | 7/1984 | Flider | 137/846 X |
| 4,951,701 | 8/1990 | Boehmer | 137/199 |

*Primary Examiner*—Robert G. Nilson
*Attorney, Agent, or Firm*—Biebel & French

[57] ABSTRACT

A bi-directional vent and overpressure relief valve is disclosed including a housing enclosing a regulator member. The regulator member is biased into contact with a wall of the housing to prevent flow of gasses through the housing. A centrally located diaphragm on the regulator provides a venting function for permitting gasses to flow in either direction through the housing when predetermined minimum pressure differentials are produced across the housing. In addition, the regulator is adapted to move out of contact with the housing in the event that an overpressure condition exists in order to provide a pressure relief function permitting a high flow of gases through the housing.

18 Claims, 3 Drawing Sheets

BI-DIRECTIONAL VENT AND OVERPRESSURE RELIEF VALVE

BACKGROUND OF THE INVENTION

The present invention relates to a bi-directional valve and, more particularly, to a bi-directional vent and overpressure relief valve for use with closed fuel tank systems.

Current environmental regulations for automobiles require that the fuel tank be provided with an evaporation system in order to properly contain gases given off by fuel for the automobile. For example, when the fuel tank heats up, such as on a hot day, the vapor pressure within the tank may increase quickly requiring a pressure release system to allow passage of vapors from the tank without releasing the vapors directly into the surrounding environment.

Accordingly, a pressure release or evaporation system is provided for the fuel tank wherein gases from the fuel tank are routed through a filter canister, such as a carbon filter, to the engine. In addition, gas flow may also take place in a direction from the engine to the fuel tank in order to avoid the formation of a vacuum in the fuel tank as the fuel tank cools or as the fuel level decreases during operation of the engine.

In order to control the gas flow to and from the fuel tank, a valve is provided located between the fuel tank and the filter canister. In this regard, there is a need for a valve which limits flow of gases in either direction between the fuel tank and the engine such that gases will flow to the engine upon the build-up of pressure to a predetermined level within the fuel tank, and gases will flow from the engine to the fuel tank when a predetermined vacuum is present within the fuel tank.

In addition, there is a need for such a valve in which the valve will provide an overpressure relief function when a substantially high pressure is produced within the fuel tank to thus provide a quick pressure release.

SUMMARY OF THE INVENTION

The present invention provides a vent and overpressure relief valve assembly for use in a closed fuel tank system whereby any excess pressure or vacuum within the fuel tank may be relieved. The valve of the present invention is particularly unique in that it is normally closed and is adapted to open and provide flow in two opposing directions, and additionally provides a secondary high flow path in one of the directions in order to provide an overpressure relief function.

Specifically, the valve of the present invention includes a housing having means defining first and second apertures. A contact surface surrounds the first aperture and a regulator element is positioned adjacent to the first aperture and includes an engaging surface for engaging the contact surface in sealing contact.

A regulator aperture is defined through the regulator element and a regulator vent element extends across the regulator aperture for preventing flow through the regulator element. In addition, a resilient biasing means, such as a spring, is provided for biasing the engaging surface of the regulator element into contact with the contact surface.

The regulator element forms a seal preventing fluid flow between the first and second apertures. The valve element is movable from a normally closed position to a first open position in response to a first minimum pressure differential between the first and second apertures. In addition, the vent element is also movable from the normally closed position to a second open position in response to a second minimum pressure differential between the first and second apertures wherein the second pressure differential is in an opposite direction to the first pressure differential.

Further, application of a third minimum fluid pressure differential, greater than the first minimum fluid pressure differential, causes the engaging surface to separate from the contact surface to permit fluid flow from the first to the second aperture around an outer peripheral edge of the regulator element. Thus, when a pressure within the fuel tank portion of a fuel system produces a pressure differential at least as great as the third minimum fluid pressure differential, the regulator element will move out of contact with the housing to permit a high fluid flow which quickly relieves the pressure within the tank.

The vent element is in the form of an arcuately-shaped diaphragm with a slit extending through the diaphragm to define opposing lip portions. In the first open position of the vent element, the lip portions are movable in a direction toward the second aperture of the housing, and in the second open position of the valve element, the lip portions are movable toward the first aperture in the housing. In addition, the pressure differential for actuating the lip portions to move to the first open position is preferably greater than the pressure differential required to move the lip portions to their second open position.

Thus, it is the primary object of the present invention to provide a bi-directional vent and overpressure relief valve which selectively vents gases through the valve in either direction at predetermined pressures, and which additionally provides for increased flow through the valve in an overpressure condition.

Other objects and advantages of the invention will be apparent from the following description, the accompanying drawings, and the appended claims.

DETAILED DESCRIPTION OF THE PREFERRED EMBODIMENT

Figure 1:
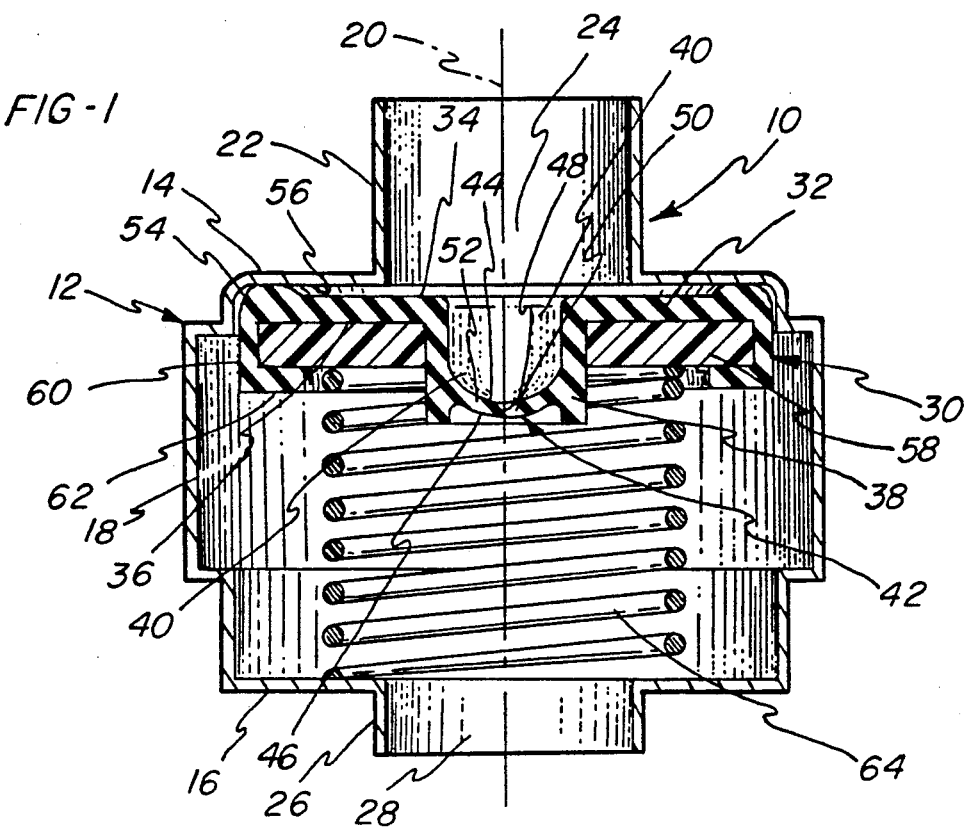
FIG. 1 is an elevational cross-sectional view of the valve assembly of the present invention.

Referring to FIG. 1, the valve assembly 10 of the present invention provides a bi-directional valve which includes a housing 12 having a top wall 14, a bottom wall 16 and a side wall 18 connecting the top and bottom walls 14, 16. The top, bottom and side walls 14, 16, 18 are preferably formed having a circular configuration about a central longitudinal axis 20.

The top wall 14 includes a tubular passage 22 defining a first aperture 24 into the valve assembly 10. The bottom wall 16 includes a tubular passage 26 defining a second aperture 28 into the valve assembly 10. The first passage 22 is intended for connection to the fuel tank side of an automobile evaporation system and the second passage 26 is intended for attachment to the engine side of the evaporation system such that the valve assembly 10 will control flow of gasses between the fuel tank and the engine.

Figure 2:
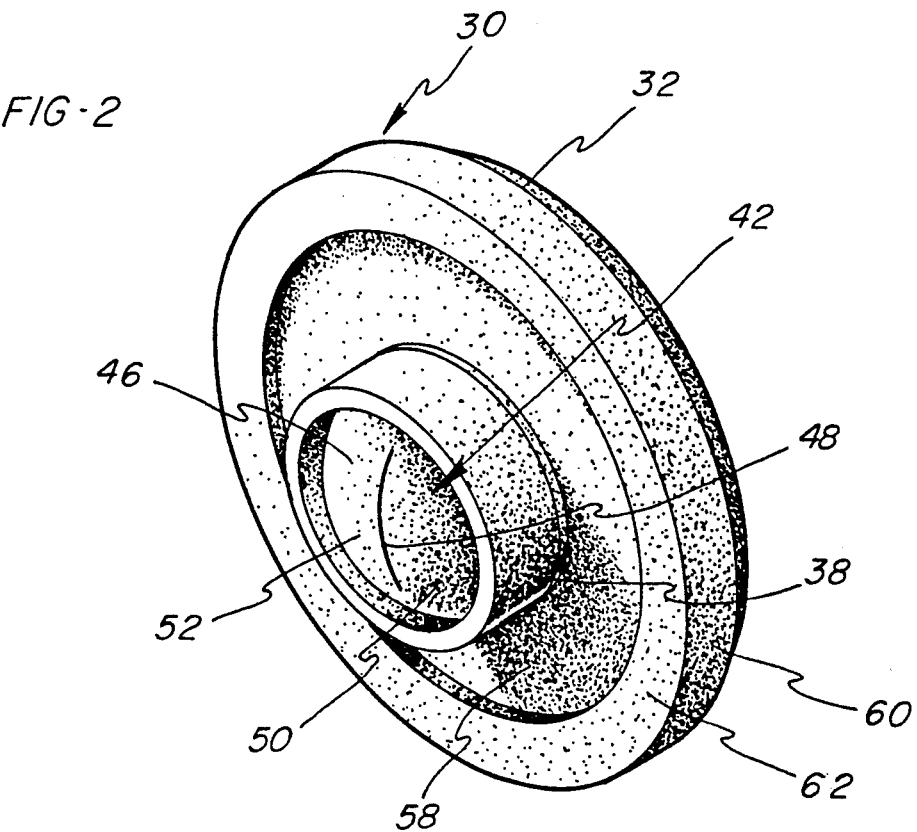
FIG. 2 is a perspective view of the regulator portion for the valve assembly from the valve end of the regulator portion.
Figure 3:
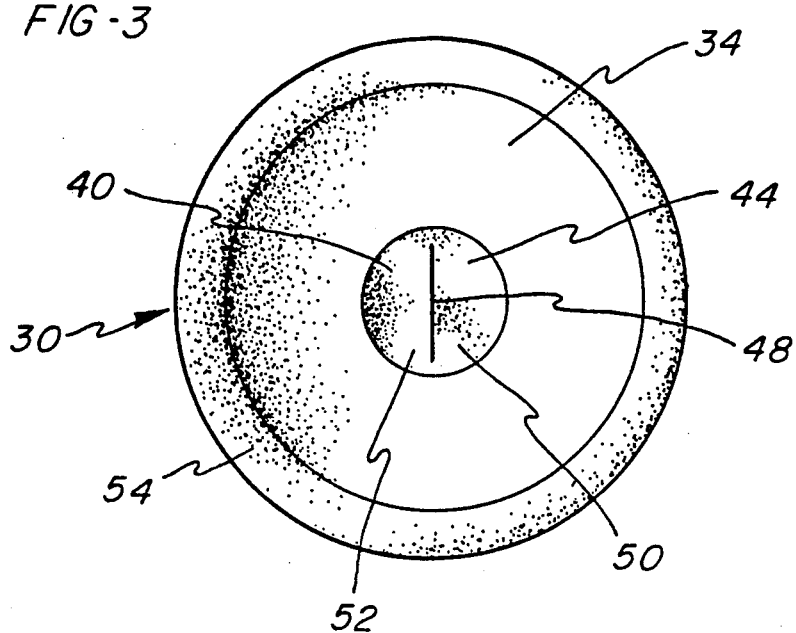
FIG. 3 is a plan view of the regulator portion taken from the engagement side of the regulator portion.

The valve assembly 10 further includes a regulator member 30 located adjacent to the first aperture 24. As may be further seen in FIGS. 2 and 3, the regulator member 30 includes an elastomeric circular body portion 32 which is formed of a material such as fluorosilicon. The body portion 32 is substantially planar and defines first and second substantially planar sides 34, 36.

An inner wall portion 38 of the regulator member 30 defines a tubular flow passage 40 through the regulator 30. The tubular flow passage 40 extends through a central portion of the regulator 30 and defines an axis which is collinear with the central longitudinal axis 20.

A diaphragm 42 is formed integrally with the body portion 32 of the regulator 30 and extends across the flow passage 40 to control fluid flow in opposing first and second directions through the regulator member 30. The diaphragm includes curved or arcuate first and second surfaces 44, 46 and a slit 48 is defined in the diaphragm 42 extending between the first and second surfaces 44, 46. It should be noted that the structure formed by the inner wall portion 38 and diaphragm 42 is substantially similar to the valve structure disclosed in U.S. Pat. No. 4,434,810 to Atkinson, assigned to the assignee of the present invention and incorporated herein by reference. Thus, the diaphragm 42 includes opposing lip portions 50, 52 located on opposing sides of the slit 48, and the lip portions 50, 52 are adapted to separate from each other to permit flow through the regulator 30 in a first direction from the first aperture 24 toward the second aperture 28 as well as in a second opposite direction from the second aperture 28 to the first aperture 24.

A raised annular sealing rib 54 extends from the planar surface 34 around the outer periphery of the regulator 30. The sealing rib 54 defines an engagement surface for engaging a contact surface 56 on the upper wall 14 in sealing contact.

In addition, a rigid annular insert 58 is located in contact with the second planar surface 36 of the regulator member 30. The insert 58 acts to limit the flexibility of the regulator body portion 32 and is held in position by a flange portion 60 and lip portion 62 extending from the sealing rib 54 around the outer periphery of the annular insert 58. The outer diameter defined by the annular insert 58 is preferably at least as great as a minimum diameter defined by the sealing rib 54 such that the annular insert is adapted to uniformly bias the engagement surface defined by the rib 54 into contact with the contact surface 56.

It should be noted that the insert 58 may be further held in place by forming the insert 58 with holes (not shown) through which the elastomeric material forming the body portion 32 may be molded to provide a mechanical lock between the body portion 32 and the insert 58. Also, the insert may be formed to provide a bias on the diaphragm lip portions 50, 52 whereby the lip portions are pressed toward each other to increase the opening pressure of the diaphragm 48 in either direction. In addition, it should also be noted that although provision of the insert 58 is preferred, in certain uses of the present valve, the insert 58 may be eliminated to permit additional flexibility of the body portion 32.

A spring 64 is positioned within the housing 12 extending from the bottom wall 16 into engagement with the annular insert 58 between radial inner and outer edges of the insert 58. The spring 64 biases the regulator 30 into contact with the upper wall 14 with a predetermined force such that the sealing rib 54 and diaphragm 42 act to prevent fluid flow through the valve assembly 10 when there is no pressure differential present between the apertures 24 and 28.

Figure 4:
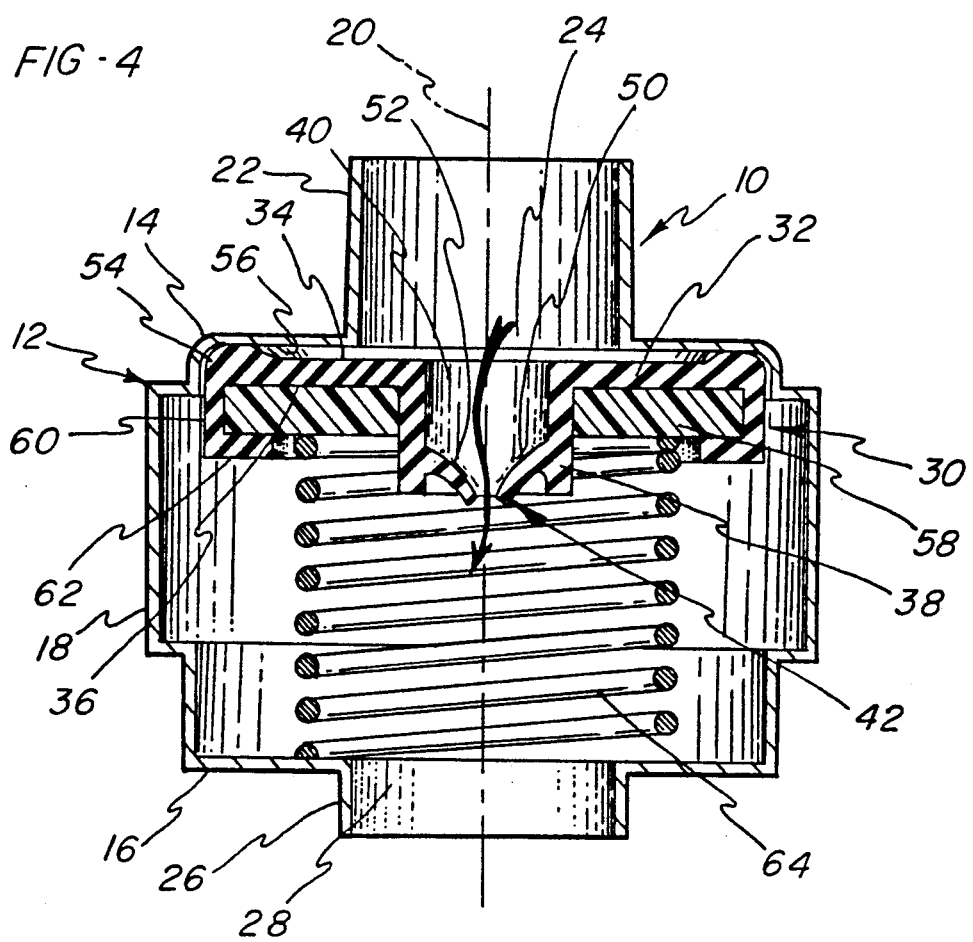
FIG. 4 is an elevational cross-sectional view of the valve assembly showing the valve in a first open position.

When a pressure differential is present between the apertures 24 and 28, such as might result from a pressure produced within a fuel tank in fluid connection with the first aperture 24, the diaphragm 42 will move to the position shown in FIG. 4 in order to release the pressure within the fuel tank for passage through the second aperture 28. The diaphragm 42 is designed such that it will remain in the closed position shown in FIG. 1 until a predetermined minimum fluid pressure differential, such as 10 mm Hg, exists in a direction from the first aperture 24 to the second aperture 28. This allows a slow venting flow of gasses from the fuel tank to the engine on to an activated carbon filled canister of the automobile in order to prevent a pressure build-up from occurring within the fuel tank.

Figure 5:
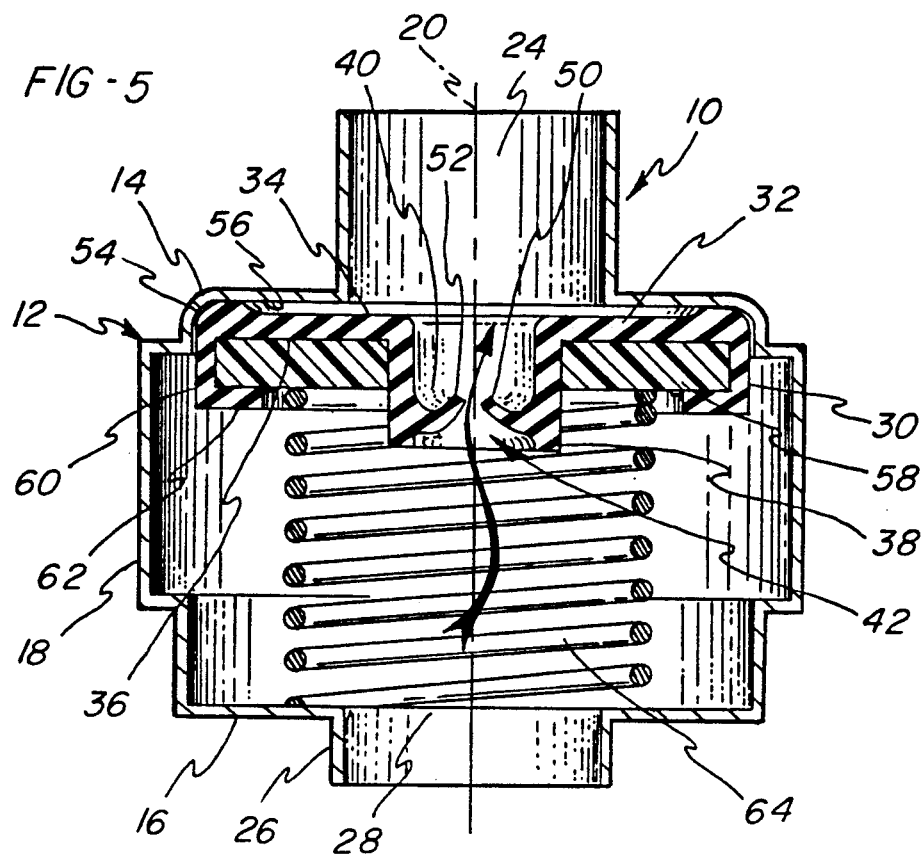
FIG. 5 is an elevational cross-sectional view of the valve assembly showing the valve in a second open position.

FIG. 5 illustrates the movement of the diaphragm 42 when a vacuum of a predetermined magnitude occurs within the fuel tank such that a pressure differential exists in a direction from the second aperture 28 toward the first aperture 24. The diaphragm 42 is designed such that the pressure differential required for opening the diaphragm 42 when a vacuum is present within the fuel tank is greater than the pressure differential required to open the diaphragm 42 when a positive pressure is present within the fuel tank, and the vacuum required to open the valve may be of a magnitude approximately equal to 20 mm Hg. The diaphragm 42 provides a slow venting which prevents the formation of a large vacuum within the fuel tank, which vacuum could interfere with the proper operation of the fuel supply system for the engine.

Figure 6:
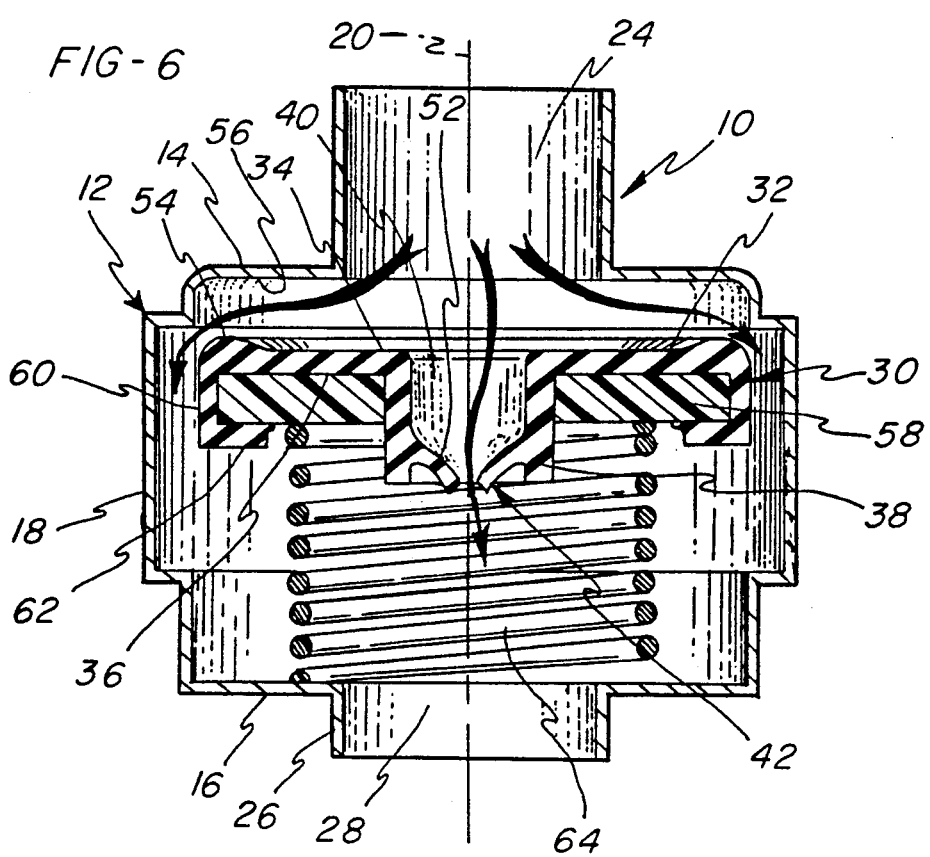
FIG. 6 is an elevational cross-sectional view of the valve assembly showing the regulator portion in an overpressure relief position.

FIG. 6 illustrates a position of the regulator 30 when an overpressure condition is produced within the fuel tank such that a large pressure differential in the same direction as the first pressure differential is produced. When an overpressure condition exists, the regulator 30 compresses the spring 64 to permit an additional gas flow between the periphery of the regulator 30 and the side wall 18 of the housing 12. The pressure required to move the regulator 30 out of contact with the top wall 14 is much greater than the pressure required to open the diaphragm 42 and is approximately equal to or greater than 200 mm Hg.

Thus, the regulator 30 provides a pressure relief function in the event that the diaphragm 42 is not able to provide sufficient flow to relieve a large pressure increase within the fuel tank.

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. A bi-direction valve comprising:
a housing including means defining first and second apertures;
a contact surface surrounding said first aperture;
a regulator element positioned adjacent to said first aperture and including an engaging surface;
means defining a regulator aperture through said regulator element;
a regulator vent element extending across said regulator aperture for preventing fluid flow through said regulator element;
resilient biasing means biasing said engaging surface into contact with said contact surface; and
wherein said regulator element forms a seal preventing fluid flow between said first and second apertures, said vent element being movable from a normally closed position to a first open position permitting fluid flow in a first direction from said first to said second aperture through said regulator element in response to a first pressure differential between said first and second apertures and said vent element being movable from said normally closed position to a second open position permitting fluid flow in a second direction opposite to said first direction in response to a second pressure differential between said first and second apertures.

2. The valve of claim 1, wherein application of a third fluid pressure differential, greater than said first fluid pressure differential, causes said engaging surface to separate from said contact surface to permit fluid to flow from said first to said second aperture around an outer peripheral edge of said regulator element.

3. The valve of claim 1, wherein said regulator vent element includes a diaphragm and means defining a slit in said diaphragm for permitting passage of fluid through said regulator aperture.

4. The valve of claim 3, wherein said diaphragm includes opposing curved surfaces and said slit is formed in said curved surfaces.

5. The valve of claim 1, including a rigid annular insert engaging said regulator element on a side thereof opposite from said engaging surface.

6. The valve of claim 5, wherein said annular insert defines radially inner and outer edges and said biasing means engages said insert between said inner and outer edges.

7. The valve of claim 1, wherein said regulator element is formed of an elastomeric material and said regulator vent element is formed integrally with said regulator element.

8. A bi-directional valve comprising:
a housing including opposing first and second walls defining first and second apertures;
a contact surface on said first wall surrounding said first aperture;
an elastomeric regulator positioned adjacent to said first aperture, said regulator having first and second sides and an engaging surface located on said first side;
means defining a regulator aperture through said regulator;
a diaphragm extending across said regulator aperture including means defining a normally closed aperture for preventing fluid flow through said regulator;
a spring extending from said second wall to said regulator to bias said engaging surface into contact with said contact surface; and
wherein said diaphragm moves to a first open position in response to a first pressure differential of a predetermined magnitude in a first direction and said diaphragm moves to a second open position in response to a second pressure differential of a predetermined magnitude in a second direction.

9. The valve of claim 8, wherein said predetermined magnitude of said first pressure differential is different from said predetermined magnitude of said second pressure differential.

10. The valve of claim 8, including a rigid insert located on said second side of said regulator.

11. The valve of claim 8, wherein said regulator includes a radially outer peripheral edge spaced from said housing and application of a third pressure differential in said first direction and with a magnitude greater than said first pressure differential causes said engaging surface to separate from said contact surface to permit fluid to flow from said first aperture, past said peripheral edge and toward said second aperture.

12. The valve of claim 8, wherein said normally closed aperture is formed by a slit extending across said diaphragm.

13. The valve of claim 8, wherein said diaphragm is formed integrally with said regulator.

14. A bi-directional valve comprising:
a housing including top and bottom walls connected by a side wall, said housing defining a central longitudinal axis for said valve;
means defining first and second apertures in said top and bottom walls;
a regulator member including an elastomeric circular body portion located within said housing, said regulator member defining opposing first and second substantially planar surfaces;
means defining a tubular flow passage extending through a central portion of said regulator member and defining an axis collinear with said central longitudinal axis;
a diaphragm formed integrally with said regulator member and extending across said flow passage to control fluid flow in a first and a second direction through said regulator member, said diaphragm including arcuate first and second surfaces;
means defining a slit in said diaphragm, said slit intersecting said central longitudinal axis;
a raised annular sealing rib adjacent to said first regulator member surface extending around the outer periphery of said regulator member and defining an engaging surface for engaging said top wall in sealing contact;
a rigid annular insert located in contact with said second regulator member surface and surrounding said means defining said tubular passage, said insert defining an outer diameter at least as great as a diameter defined by said sealing rib;
a coil spring positioned in contact with said bottom wall and extending into contact with said insert whereby said sealing rib is biased into sealing contact with said top wall; and
wherein said slit is normally closed to form a barrier to fluid flow through said flow passage, and said slit opens to permit flow in said first direction when a first pressure of a predetermined minimum magnitude is applied at said aperture in said top wall and said slit opens to permit flow in said second direction opposite to said first direction when a second pressure of a predetermined minimum magnitude greater than and opposite to said first pressure is applied, and said spring permitting said sealing rib to separate from said top wall to relieve an overpressure condition when a third pressure of greater magnitude than said first pressure is applied at said aperture in said top wall.

15. A bi-directional valve comprising:
a housing including means defining first and second apertures;
a contact surface surrounding said first aperture;
a regulator element positioned adjacent to said first aperture and including an engaging surface;
means defining a regulator aperture through said regulator element;
a regulator vent element extending across said regulator aperture for preventing fluid flow through said regulator element;
resilient biasing means biasing said engaging surface into contact with said contact surface;
wherein said regulator element forms a seal preventing fluid flow between said first and second apertures, said vent element being movable from a normally closed position to a first open position to permit fluid flow in a first direction from said first to said second aperture in response to a first fluid pressure, and
said engaging surface being movable to separate from said contact surface to permit fluid flow from said first aperture to said second aperture around an outer peripheral edge of said regulator element in response to a second fluid pressure greater than said first fluid pressure.

16. The valve of claim 15, wherein said resilient biasing means is a compression spring which is compressed as said engaging surface separates from said contact surface.

17. The valve of claim 16, wherein said vent element is movable from said normally closed position to a second open position to permit fluid flow in a second direction opposite to said first direction.

18. The valve of claim 15, wherein said regulator vent element includes a diaphragm and means defining an elongated slit in said diaphragm for permitting passage of fluid through said regulator aperture.

* * * * *